US010595328B2

(12) United States Patent
Zeng et al.

(10) Patent No.: US 10,595,328 B2
(45) Date of Patent: *Mar. 17, 2020

(54) UPLINK CHANNEL SELECTION USING CHANNEL INTERFERENCE TOLERANCE LEVEL FEEDBACK FOR GRANTLESS DATA TRANSMISSION

(71) Applicant: QUALCOMM Incorporated, San Diego, CA (US)

(72) Inventors: Wei Zeng, Cupertino, CA (US); Joseph Binamira Soriaga, San Diego, CA (US); Seyong Park, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/030,592

(22) Filed: Jul. 9, 2018

(65) Prior Publication Data
US 2018/0324836 A1 Nov. 8, 2018

Related U.S. Application Data

(63) Continuation of application No. 15/187,588, filed on Jun. 20, 2016, now Pat. No. 10,045,368.
(Continued)

(51) Int. Cl.
H04W 72/12 (2009.01)
H04W 72/08 (2009.01)
(Continued)

(52) U.S. Cl.
CPC ....... H04W 72/1268 (2013.01); H04L 1/0003 (2013.01); H04W 72/0446 (2013.01);
(Continued)

(58) Field of Classification Search
CPC .......... H04W 72/1268; H04W 74/006; H04W 72/1273; H04W 72/0082; H04L 1/0003
See application file for complete search history.

(56) References Cited

U.S. PATENT DOCUMENTS 8,086,256 B2   12/2011   Tajima et al.
2007/0168326 A1  7/2007  Das et al.
(Continued)

FOREIGN PATENT DOCUMENTS

WO          07075744        7/2007
WO      WO 2016/167828    *  9/2015  ............ H04W 74/08

OTHER PUBLICATIONS

International Search Report and Written Opinion—PCT/US2016/060698—ISA/EPO—dated Feb. 14, 2017.
(Continued)

Primary Examiner — Mohammad S Anwar
(74) Attorney, Agent, or Firm — Loza & Loza, LLP/Qualcomm

(57) ABSTRACT

Aspects of the present disclosure provide for a network assisted grantless data transmission method operable in a wireless communication network. A wireless device may transmit grantless data without requesting a scheduling entity to grant and schedule network resources prior to the grantless data transmission. A scheduling entity determines interference tolerance information of a plurality of uplink channels, wherein the interference tolerance information is configured to individually indicate an availability of each of the plurality of uplink channels for grantless uplink data transmission. The scheduling entity broadcasts the interference tolerance information to one or more subordinate entities or wireless devices.

30 Claims, 13 Drawing Sheets

Related U.S. Application Data

(60) Provisional application No. 62/262,108, filed on Dec. 2, 2015.

(51) Int. Cl.
*H04L 1/00* (2006.01)
*H04W 72/04* (2009.01)
*H04W 74/00* (2009.01)

(52) U.S. Cl.
CPC ..... *H04W 72/082* (2013.01); *H04W 72/1273* (2013.01); *H04W 74/006* (2013.01)

(56) References Cited

U.S. PATENT DOCUMENTS

| | | |
|---|---|---|
| 2014/0146754 A1 | 5/2014 | Bayesteh et al. |
| 2014/0192767 A1 | 7/2014 | Au et al. |
| 2014/0226504 A1 | 8/2014 | Tavildar et al. |
| 2014/0254544 A1 | 9/2014 | Kar et al. |
| 2015/0334643 A1 | 11/2015 | Maaref et al. |
| 2017/0164390 A1 | 6/2017 | Zeng et al. |

OTHER PUBLICATIONS

Samsung Electronics: "Discussions of Grant-Free Multiple Access in CIoT (Update of GPC150512)," GPC150521, 3GPP TSG GERAN1 Adhoc #3, Kista, Sweden, Jun. 29-Jul. 2, 2015, pp. 1-9.

\* cited by examiner

UPLINK CHANNEL SELECTION USING CHANNEL INTERFERENCE TOLERANCE LEVEL FEEDBACK FOR GRANTLESS DATA TRANSMISSION

PRIORITY CLAIM

This application is a continuation of prior U.S. application Ser. No. 15/187,588, filed Jun. 20, 2016, which claims priority to and the benefit of U.S. provisional application No. 62/262,108 filed on Dec. 2, 2015.

TECHNICAL FIELD

The technology discussed below relates generally to wireless communication systems, and more particularly, to grantless data transmission in a wireless communication network.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems. These multiple access technologies have been adopted in various telecommunication standards to provide a common protocol that enables different wireless devices to communicate on a municipal, national, regional, and even global level.

In a shared resource network, a wireless device transmits data (uplink data) to the network using a request-grant method in which the wireless device requests a permission (grant) from the network to transmit data, and a network entity (e.g., a base station, Node B, eNode B, access point, scheduling entity, etc.) decides when and how the wireless device may transmit its data using certain network resources (e.g., time and frequency resources or channels). The overhead (e.g., signaling and power usage) of the request-grant procedure can be undesirably high when the amount of data transmitted is relatively small compared to the overhead data. The request-grant overhead may be more significant for certain types or classes of wireless devices that typically transmit small amount of data or payload relative to the overhead. Examples of such wireless devices include Internet of Everything (IoE) devices, Internet of Things (IoT) devices, network connected sensors and monitoring devices, and other small data devices.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure provide for a network assisted grantless data transmission method operable in a wireless communication network. A wireless device may transmit grantless data without requesting a scheduling entity to grant and schedule network resources prior to the grantless data transmission.

An aspect of the present disclosure provides a method of operating a scheduling entity in a wireless communication network. The method determines interference tolerance information of a plurality of uplink channels, wherein the interference tolerance information is configured to individually indicate an availability of each of the plurality of uplink channels for grantless uplink data transmission. The method further broadcasts the interference tolerance information to one or more subordinate entities. The method further receives a grantless uplink data transmission from the one or more subordinate entities utilizing one or more of the plurality of uplink channels according to the interference tolerance information. The interference tolerance information is further configured to indicate two or more levels of different grantless access for each of the plurality of uplink channels.

An aspect of the present disclosure provides a method of operating a subordinate entity in a wireless communication network. The method determines channel qualities of a plurality of uplink channels and corresponding modulation and coding schemes (MCSs) supportable by the channel qualities. The method further receives an interference tolerance information broadcast from a scheduling entity, wherein the interference tolerance information is configured to individually indicate an availability of each of the plurality of uplink channels for grantless data transmission. The method further selects an uplink channel among the plurality of uplink channels and an MCS among the corresponding MCSs based on the received interference tolerance information. The method further transmits grantless data utilizing the selected uplink channel and MCS.

An aspect of the present disclosure provides a scheduling entity in a wireless communication network. The scheduling entity includes a computer-readable medium stored with executable code, a communication interface configured for wireless communication, and a processor operatively coupled to the communication interface and computer-readable medium. The processor is configured by executing the code to determine interference tolerance information of a plurality of uplink channels, wherein the interference tolerance information is configured to individually indicate an availability of each of the plurality of uplink channels for grantless uplink data transmission. The processor is further configured to broadcast the interference tolerance information to one or more subordinate entities. The processor is further configured to receive a grantless uplink data transmission from the one or more subordinate entities utilizing one or more of the plurality of uplink channels according to the interference tolerance information.

An aspect of the present disclosure provides a subordinate entity in a wireless communication network. The subordinate entity includes a computer-readable medium stored with executable code, a communication interface configured for wireless communication, and a processor operatively coupled to the communication interface and computer-readable medium. The processor is configured by executing the code to determine channel qualities of a plurality of uplink channels and corresponding modulation and coding schemes (MCSs) supportable by the channel qualities. The processor is further configured to receive an interference tolerance information broadcast from a scheduling entity, wherein the interference tolerance information is configured to individually indicate an availability of each of the plurality of uplink channels for grantless data transmission. The processor is further configured to select an uplink channel among the plurality of uplink channels and an MCS among the corresponding MCSs based on the received interference tolerance information. The processor is further configured to transmit grantless data utilizing the selected uplink channel and MCS.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, and/or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the present disclosure provide for a network assisted grantless data transmission method operable in a wireless communication network. A wireless device may transmit grantless data without requesting a scheduling entity to grant and schedule network resources prior to the grantless data transmission. When a wireless device transmits data without first requesting a grant of certain network resources, such data may be called grantless data in this disclosure, and its transmission may be called grantless data transmission. In some aspects of the disclosure, a scheduling entity (e.g., base station, access point, Node B, and/or evolved Node B (eNode B or eNB)) may broadcast certain network information to assist grantless data transmission. This disclosure is particularly applicable for certain types of small data wireless devices that typically transmit small amount of data relative to communication overhead. Examples of such small data wireless devices include Internet of Everything (IoE) devices, Internet of Things (IoT) devices, network connected sensors and monitoring devices, and/or other small data devices in general. The various aspects of the disclosure will be described and illustrated with a wireless network with features similar to a Long-Term Evolution (LTE) network. However, the concepts of the present disclosure may be applied to and implemented with other wireless communication networks and systems. Furthermore, the data transmission methods disclosed in the present disclosure may be applied to any wireless devices, not limited to small data devices.

Figure 1:
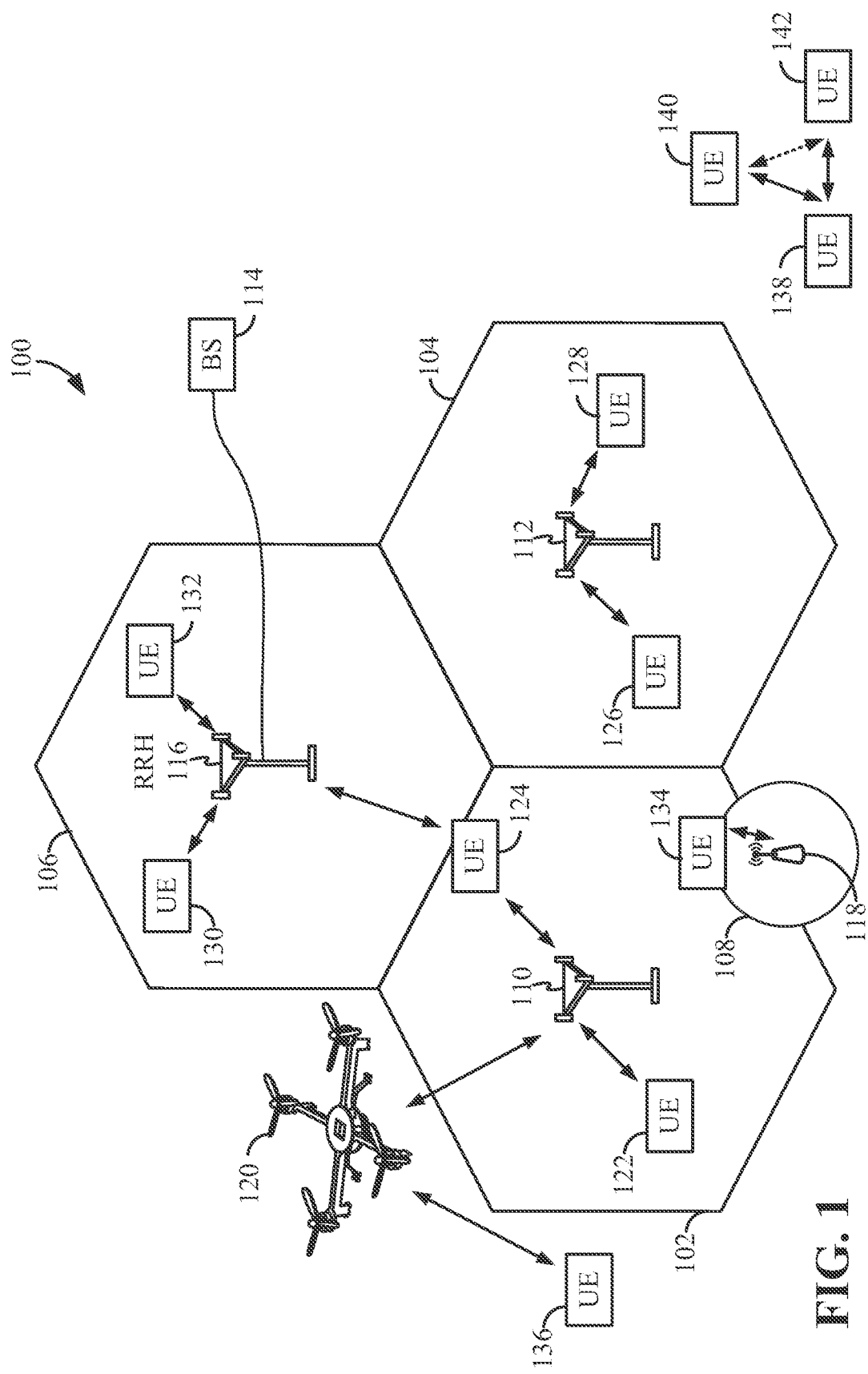
FIG. 1 is a diagram illustrating an example of an access network according to some aspects of the disclosure.

The various concepts presented throughout this disclosure may be implemented across a broad variety of telecommunication systems, network architectures, and communication standards. Referring now to FIG. 1, as an illustrative example without limitation, a simplified schematic illustration of an access network 100 is provided.

The geographic region covered by the access network 100 may be divided into a number of cellular regions (cells), including macrocells 102, 104, and 106, and a small cell 108, each of which may include one or more sectors. Cells may be defined geographically (e.g., by coverage area) and/or may be defined in accordance with a frequency, scrambling code, etc. In a cell that is divided into sectors, the multiple sectors within a cell can be formed by groups of antennas with each antenna responsible for communication with mobile devices in a portion of the cell.

In general, a radio transceiver apparatus serves each cell. A radio transceiver apparatus is commonly referred to as a base station (BS) in many wireless communication systems, but may also be referred to by those skilled in the art as a base transceiver station (BTS), a radio base station, a radio transceiver, a transceiver function, a basic service set (BSS), an extended service set (ESS), an access point (AP), a Node B, an eNode B, and/or some other suitable terminology.

In FIG. 1, two high-power base stations 110 and 112 are shown in cells 102 and 104; and a third high-power base station 114 is shown controlling a remote radio head (RRH) 116 in cell 106. In this example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In some examples, the base stations may be interconnected to one another and/or to one or more other base stations or network nodes (not shown) in the access network 100 through various types of backhaul interfaces such as a direct physical connection, a virtual network, and/or the like using any suitable transport network.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, and/or some other suitable terminology.

Within the present document, a "mobile" apparatus need not necessarily have a capability to move, and may be stationary. Some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, and/or other infrastructure; industrial automation and enterprise devices; consumer and wearable devices, such as eyewear, a wearable camera, a smart watch, a health or fitness tracker, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, the quadcopter 120 may be configured to function as a UE. For example, the quadcopter 120 may operate within cell 102 by communicating with base station 110.

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), and/or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), and/or other suitable multiplexing schemes.

Within the access network 100, during a call with a scheduling entity, and/or at any other time, a UE may monitor various parameters of the signal from its serving cell as well as various parameters of neighboring cells. Further, depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. For example, the resources may include time and frequency resources. In one specific example, the resources may include a plurality of uplink channels or carriers.

Base stations are not the only entities that may function as a scheduling entity. That is, in some examples, a UE may function as a scheduling entity, scheduling resources for one or more subordinate entities (e.g., one or more other UEs). For example, UE 138 is illustrated communicating with UEs 140 and 142. In this example, the UE 138 is functioning as a scheduling entity, and UEs 140 and 142 utilize resources scheduled by the UE 138 for wireless communication. A UE may function as a scheduling entity in a peer-to-peer (P2P) network, and/or in a mesh network. In a mesh network example, UEs 140 and 142 may optionally communicate directly with one another in addition to communicating with the scheduling entity 138.

Figure 2:
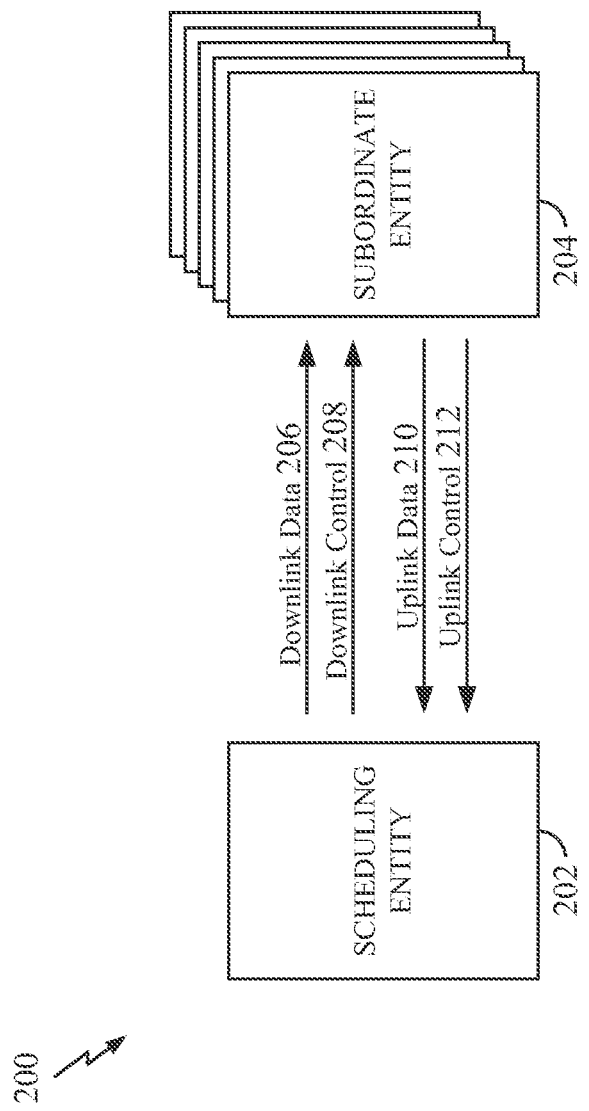
FIG. 2 is a block diagram illustrating an example of a scheduling entity communicating with one or more subordinate entities according to some aspects of the disclosure.

Thus, in a wireless communication network with a scheduled access to time-frequency resources and having a cellular configuration, a P2P configuration, and a mesh configuration, a scheduling entity and one or more subordinate entities may communicate utilizing the scheduled resources. Referring now to FIG. 2, a block diagram illustrates a scheduling entity 202 and a plurality of subordinate entities 204. Here, the scheduling entity 202 may correspond to the base stations 110, 112, 114, and 118. In additional examples, the scheduling entity 202 may correspond to the UE 138, the quadcopter 120, and/or any other suitable node in the access network 100. Similarly, in various examples, the subordinate entity 204 may correspond to the UE 122, 124, 126, 128, 130, 132, 134, 136, 138, 140, and 142, and/or any other suitable node in the access network 100.

As illustrated in FIG. 2, the scheduling entity 202 may broadcast data 206 to one or more subordinate entities 204 (the data may be referred to as downlink data). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink data 210 from one or more subordinate entities to the scheduling entity 202. Another way to describe the system may be to use the term broadcast channel multiplexing. In accordance with aspects of the present disclosure, the term uplink may refer to a point-to-point transmission originating at a subordinate entity 204. Broadly, the subordinate entity 204 is a node or device that receives scheduling control information, including but not limited to scheduling grants, synchronization or timing information, and/or other control information from another entity in the wireless communication network such as the scheduling entity 202.

The scheduling entity 202 may broadcast a control channel 208 to one or more subordinate entities 204. In some examples, the scheduling entity 202 may broadcast interference tolerance information to the subordinate entities 204 as described in relation to FIGS. 7-13. Uplink data 210 and/or downlink data 206 may be transmitted using a transmission time interval (TTI). Here, a TTI may correspond to an encapsulated set or packet of information capable of being independently decoded. In various examples, TTIs may correspond to frames, subframes, data blocks, time slots, and/or other suitable groupings of bits for transmission.

Furthermore, the subordinate entities 204 may transmit uplink control information 212 to the scheduling entity 202. Uplink control information may include a variety of packet types and categories, including pilots, reference signals, and information configured to enable or assist in decoding uplink data transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit in the downlink control channel 208 information that may schedule the TTI for uplink packets. In a further example, the uplink control channel 212 may include hybrid automatic repeat request (HARQ) feedback transmissions, such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

The channels illustrated in FIG. 2 are not necessarily all of the channels that may be utilized between a scheduling entity 202 and subordinate entities 204, and those of ordinary skill in the art will recognize that other channels may be utilized in addition to those illustrated, such as other data, control, and feedback channels.

Figure 3:
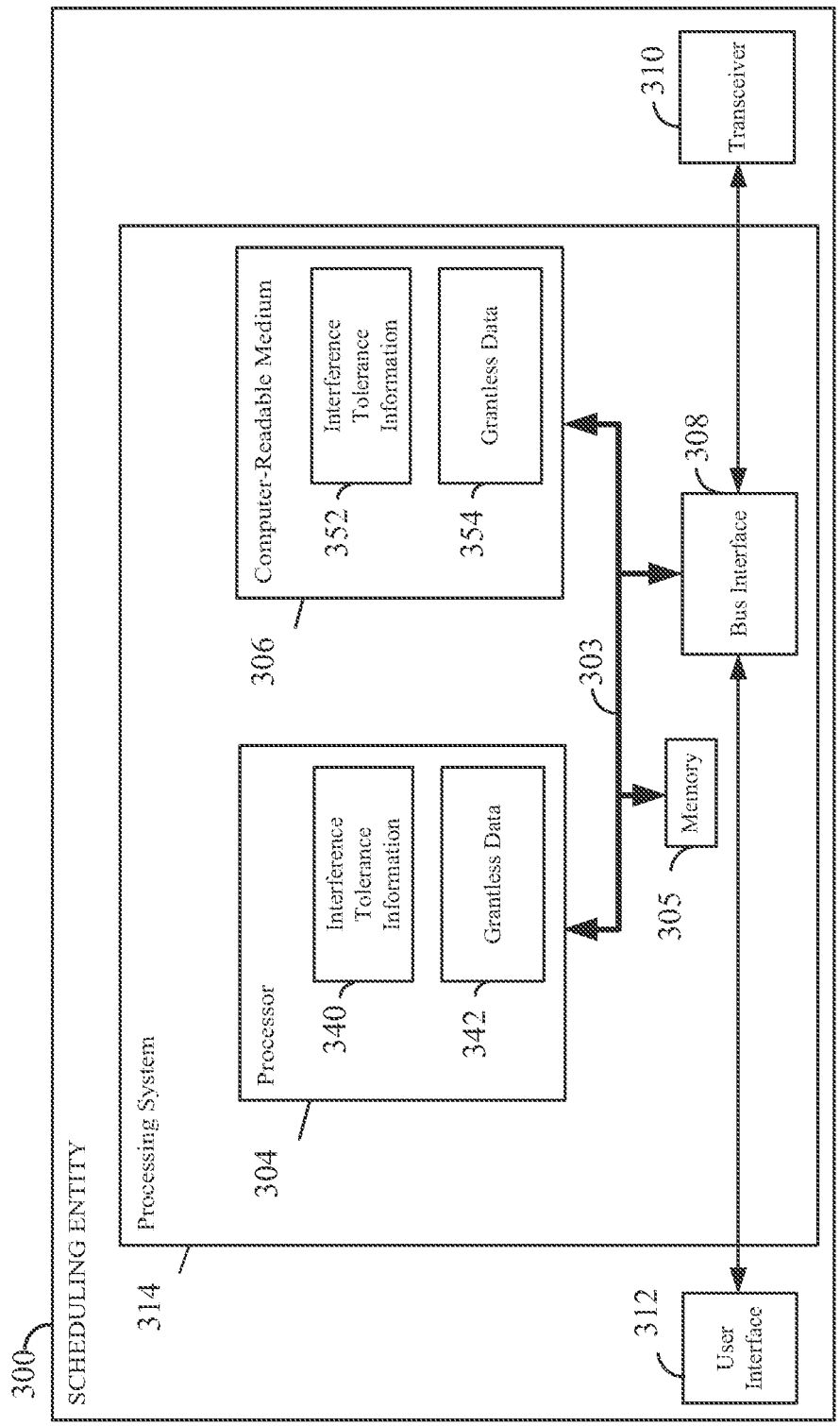
FIG. 3 is a diagram illustrating an example of a hardware implementation for a scheduling entity employing a processing system according to some aspects of the disclosure.

FIG. 3 is a simplified block diagram illustrating an example of a hardware implementation for a scheduling entity 300 employing a processing system 314. For example, the scheduling entity 300 may be a scheduling entity as illustrated in any one or more of FIGS. 1, 2, 6, and/or 7. The scheduling entity 300 may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In various examples, the scheduling entity 300 may be configured to perform any one or more of the functions described herein. For example, the processor 304, as utilized in a scheduling entity 300, may be used to implement any one or more of the processes described below and illustrated in FIGS. 8-10.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a communication interface or means for communicating with various other apparatus over a transmission medium. For example, the transceiver 310 may include one or more transmitters and receivers. Depending upon the nature of the apparatus, a user interface 312 (e.g., keypad, display, speaker, microphone, joystick, camera, touchscreen, touchpad, gesture sensors) may also be provided.

In some aspects of the disclosure, the processor 304 may include various blocks, components, and/or circuitry that can be configured for various functions, including, for example, the functions, procedures, and processes described in connection with FIGS. 8-10. For example, the processor 304 may include an interference tolerance information block 340 and a grantless data block 342. The interference tolerance information block 340 may be configured to determine and broadcast interference tolerance information utilizing the transceiver 310 as described throughout the present disclosure, for example, in relation to FIGS. 8-10. The grantless data block 342 may be configured to perform various functions related to grantless data, for example, receiving UL grantless data from a plurality of subordinate entities utilizing the transceiver 310.

The processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 and the memory 305 may also be used for storing data that is manipulated by the processor 304 when executing software.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 8:
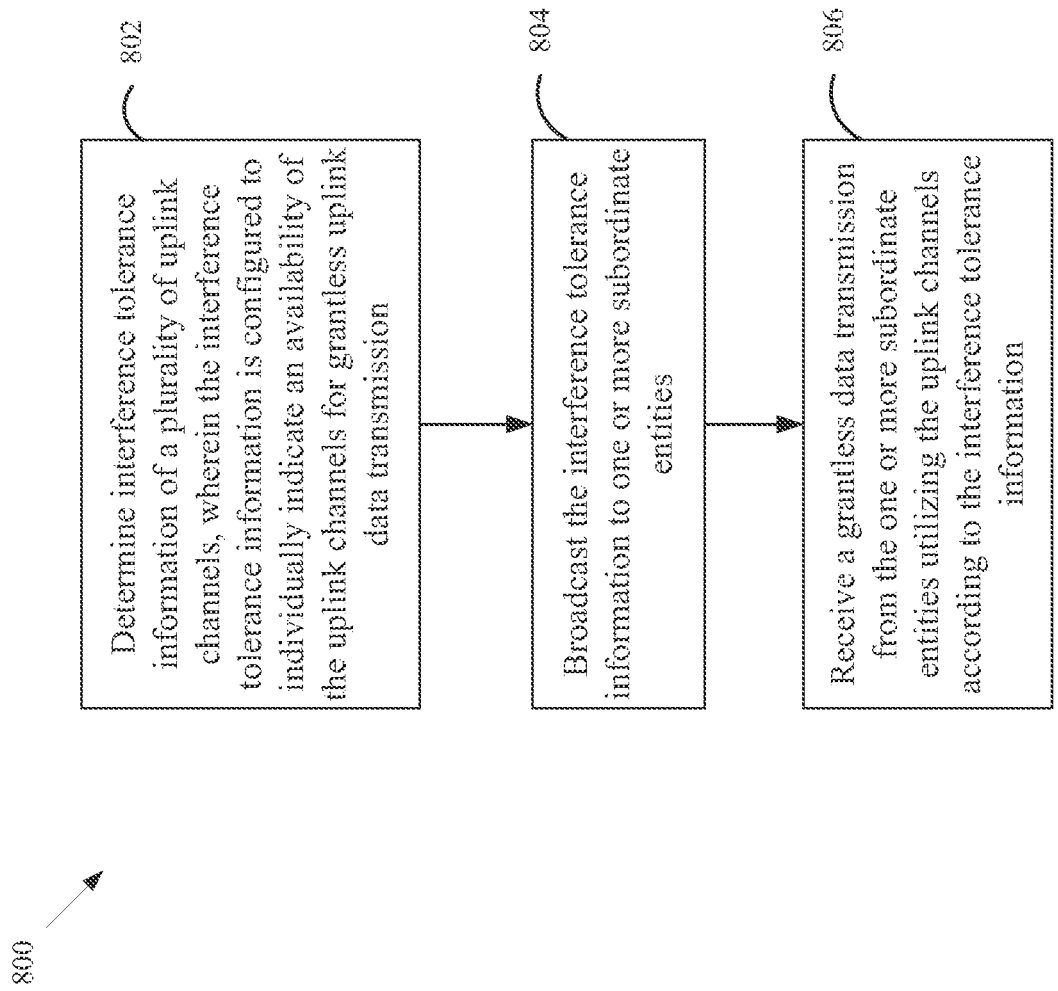
FIG. 8 is a flowchart illustrating a method of broadcasting interference tolerance information to assist grantless data transmission according to some aspects of the disclosure.
Figure 9:
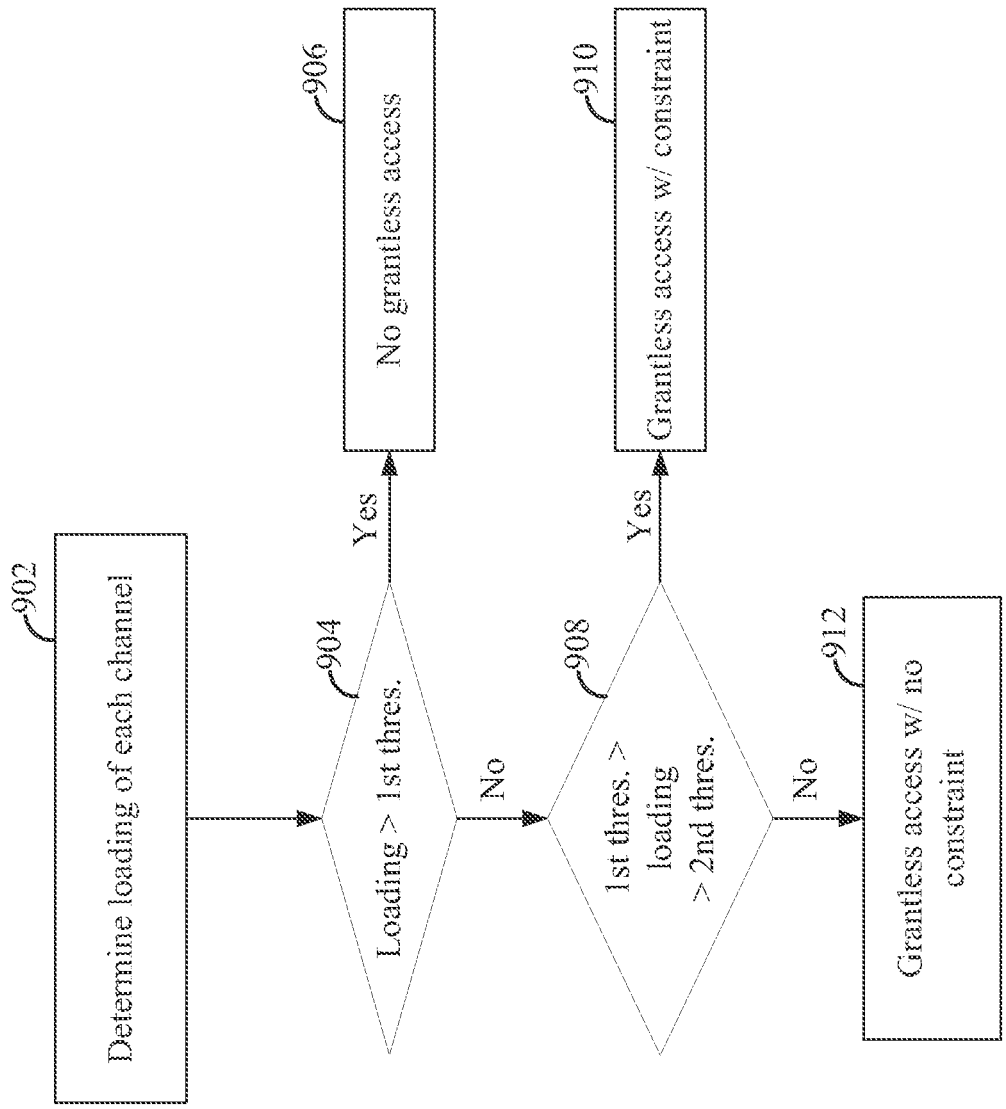
FIG. 9 is a flowchart illustrating a method of determining interference tolerance information based on a network loading according to some aspects of the disclosure.
Figure 10:
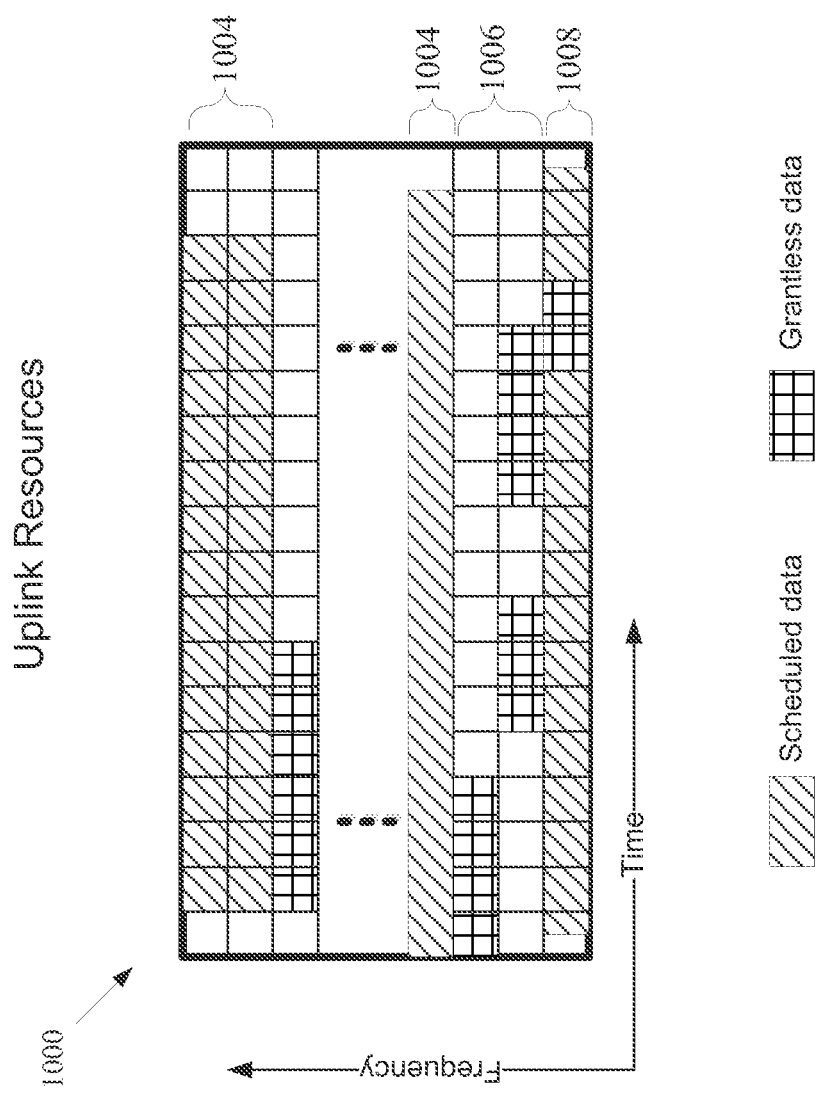
FIG. 10 is a diagram illustrating an example of uplink network resources utilized for grantless data transmission based on interference tolerance information according to some aspects of the disclosure.

In one or more examples, the computer-readable storage medium 306 may include software or code configured for various functions, including, for example, grantless data transmission as described in relation to FIGS. 8-10. For example, the software or code may include interference tolerance information instructions 352 and grantless data instructions 354. The interference tolerance information instructions 352 may configure the processor 304 to determine and broadcast interference tolerance information as described throughout the present disclosure, for example, in relation to FIGS. 8-10. The grantless data instructions 354 may configure the processor 304 to perform various functions related to grantless data, for example, receiving grantless UL data from a plurality of subordinate entities.

Figure 4:
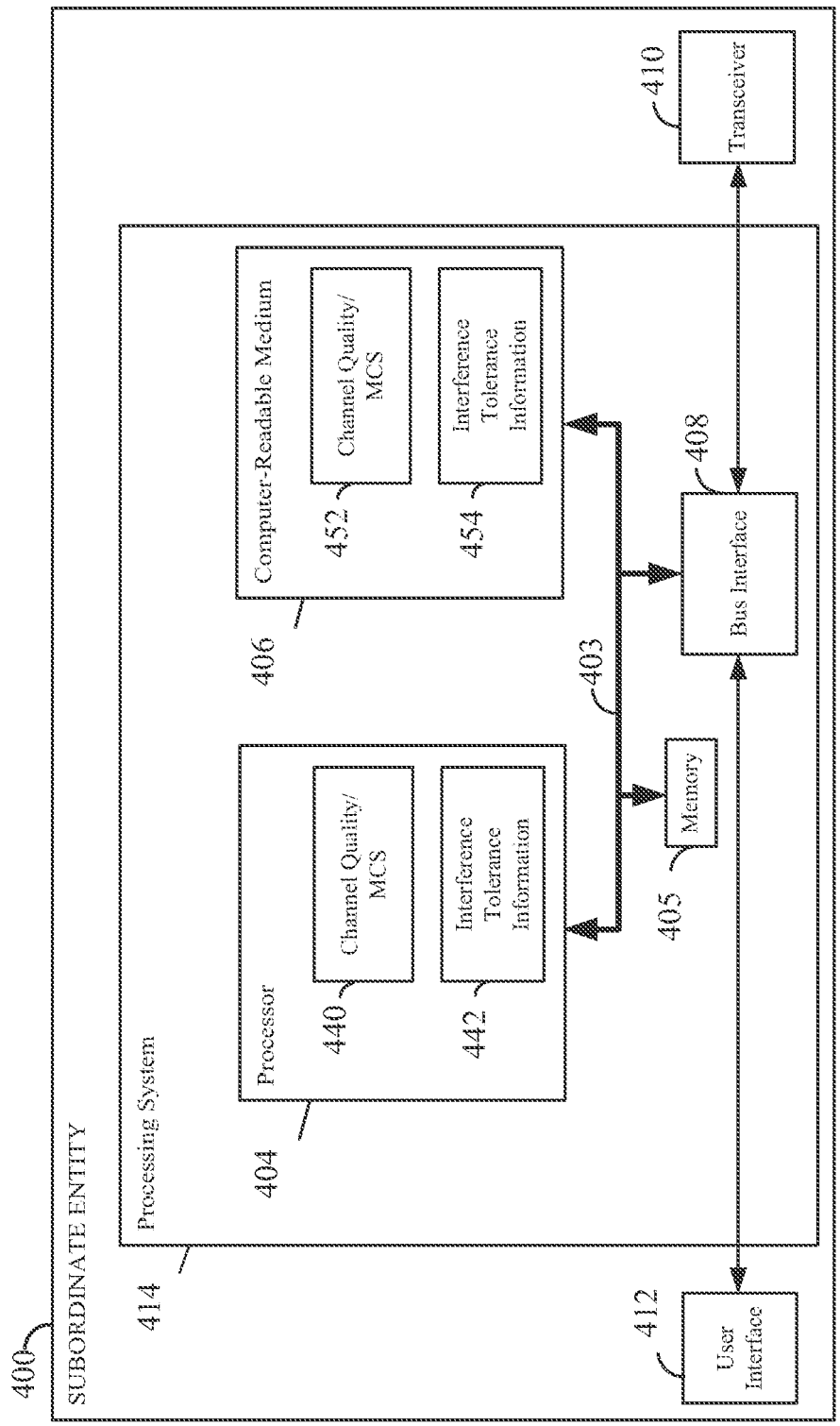
FIG. 4 is a diagram illustrating an example of a hardware implementation for a subordinate entity employing a processing system according to some aspects of the disclosure.

FIG. 4 is a conceptual diagram illustrating an example of a hardware implementation for an exemplary subordinate entity 400 employing a processing system 414. In accordance with various aspects of the disclosure, an element, or any portion of an element, or any combination of elements may be implemented with a processing system 414 that includes one or more processors 404. For example, the subordinate entity 400 may be a subordinate entity as illustrated in any one or more of FIGS. 1, 2, 6, and/or 7.

The processing system 414 may be substantially the same as the processing system 314 illustrated in FIG. 3, including a bus interface 408, a bus 402, memory 405, a processor 404, and a computer-readable medium 406. Furthermore, the subordinate entity 400 may include a user interface 412 and a transceiver 410 substantially similar to those described above in FIG. 3. That is, the processor 404, as utilized in a subordinate entity 400, may be used to implement any one or more of the processes described throughout the disclosure.

Figure 11:
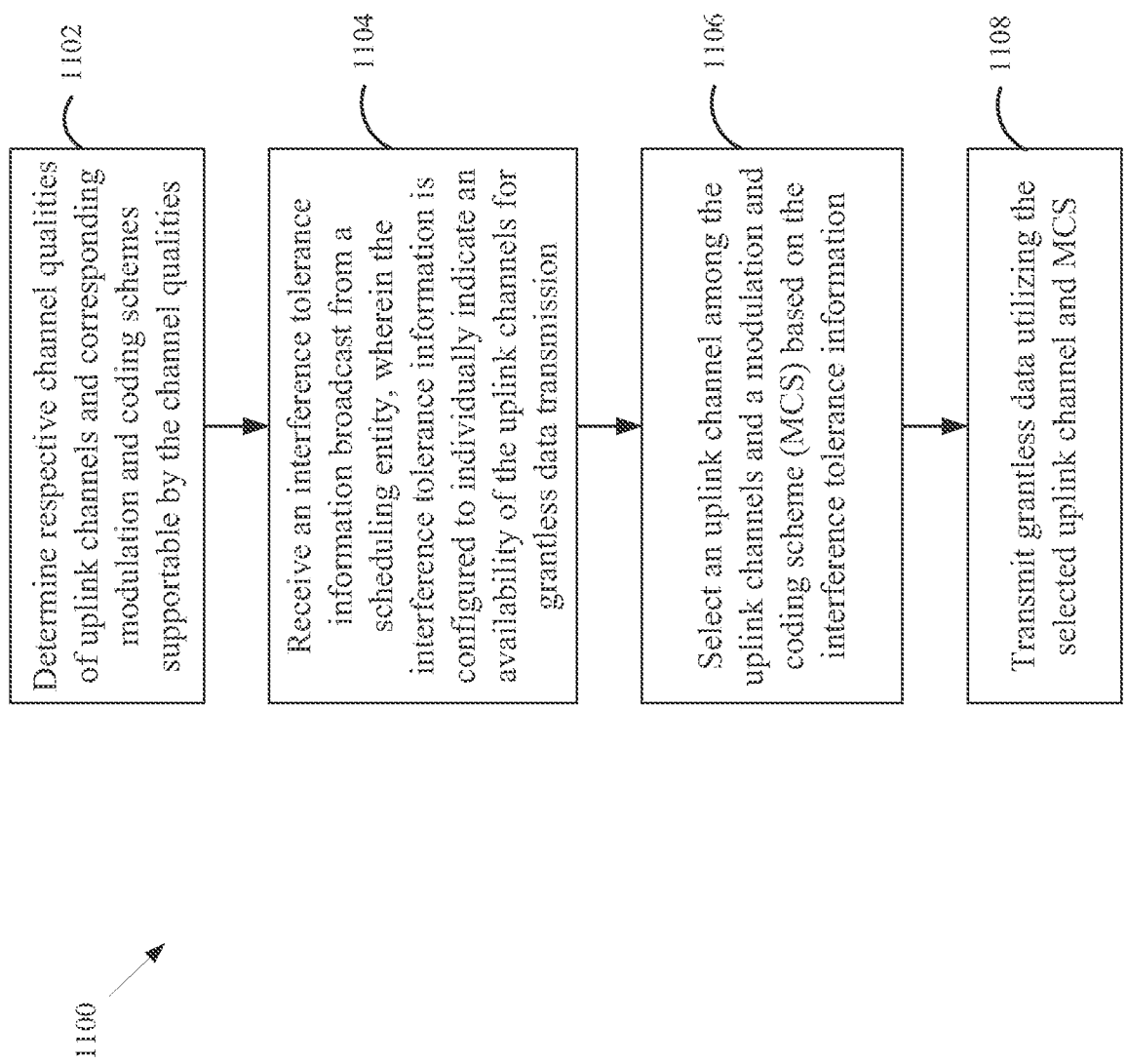
FIG. 11 is a flowchart illustrating a method of transmitting grantless uplink data based on interference tolerance information broadcasted from a scheduling entity according to some aspects of the disclosure.
Figure 12:
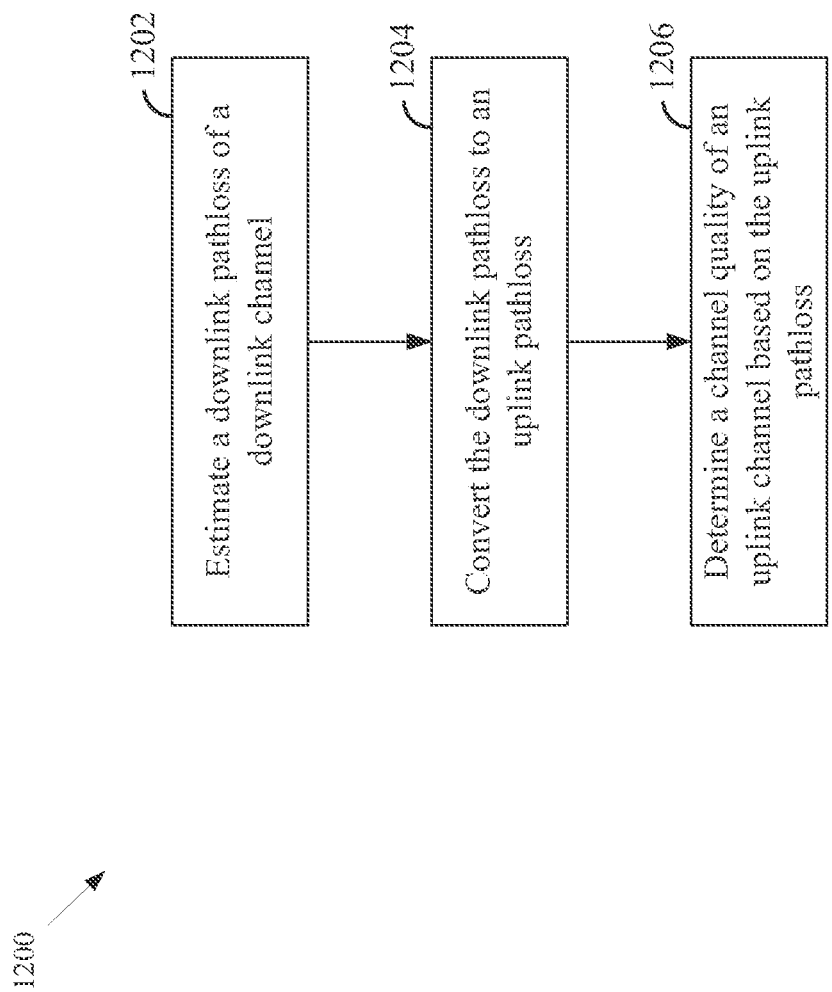
FIG. 12 is a flowchart illustrating a method for determining a channel quality of an uplink channel according to some aspects of the disclosure.
Figure 13:
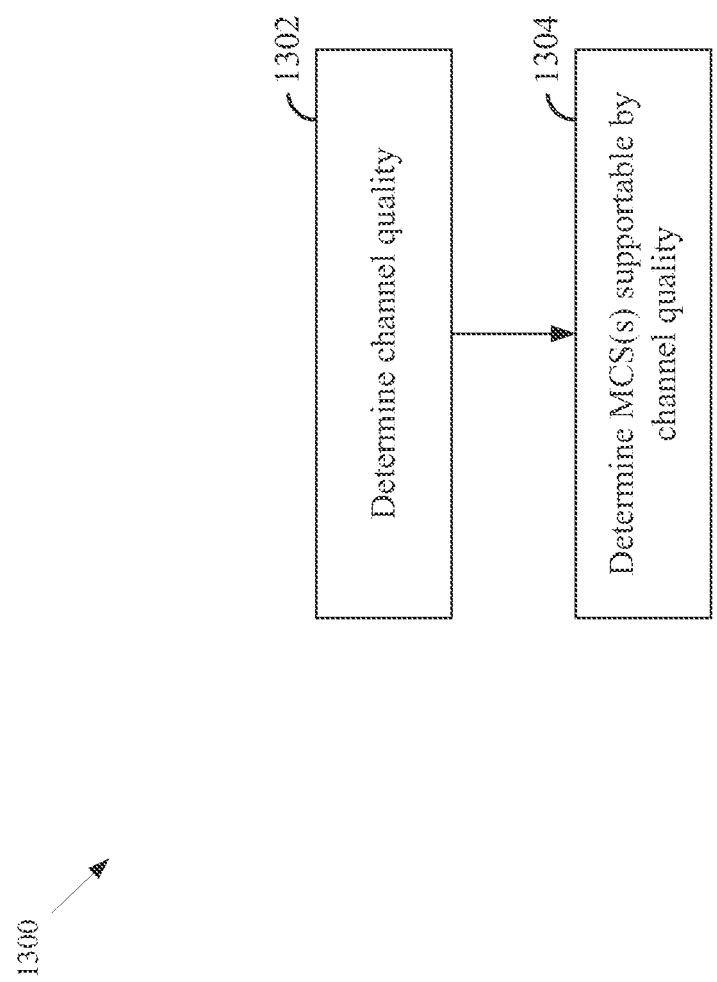
FIG. 13 is a flowchart illustrating a method for determining a modulation and coding scheme of an uplink channel according to some aspects of the disclosure.

In some aspects of the disclosure, the processor 404 may include various blocks, components, and/or circuitry that can be configured to implement one or more of the functions described in relation to FIGS. 11-13, including, e.g., a channel quality/modulating and coding scheme (MCS) block 440 and an interference tolerance information block 442. The channel quality/MCS block 440 may be configured to determine the channel qualities of a plurality of UL channels and corresponding MCS(s) that can be supported by the channels.

The interference tolerance information block 442 may be configured to receive an interference tolerance information broadcast from a scheduling entity, utilizing the transceiver 410. The interference tolerance information individually indicates the availability of each one of the uplink channels for grantless data transmission. Then, the subordinate entity can select an uplink channel among the uplink channels and an MCS based on the interference tolerance information. The subordinate entity 400 may utilize the processor 404 and transceiver 410 to transmit grantless data utilizing the selected uplink channel and MCS.

In some aspects of the disclosure, the software may include executable code that causes the processor 404 to perform various grantless data transmission functions described in relation to FIGS. 11-13. For example, the software may include Channel Quality/MCS instructions 452 that configure the processor 404 to determine channel quality of one or more uplink channels and corresponding MCSs for the channels. In some aspects of the disclosure, the software may include interference tolerance information instructions 454 that configure the processor 404 to receive an interference tolerance information broadcast from a scheduling entity. The software may further include instructions that configure the processor 404 to select an uplink channel and an MCS based on the interference tolerance information. The software may further include instructions that configure the processor 404 to transmit grantless data utilizing the selected uplink channel and MCS.

Various frame structures may be used to support DL and UL transmissions including grantless access between a scheduling entity and subordinate entities. However, as those skilled in the art will readily appreciate, the frame structure for any particular application may be different depending on any number of factors. In one example, a frame, which may be a 10 ms frame or any suitable duration, may be divided into 10 equally sized sub-frames. Each sub-frame may include two consecutive time slots. A resource grid may be used to represent two time slots, each time slot including a resource block. The resource grid is divided into multiple resource elements. The number of bits carried by each resource element may depend on the MCS. Thus, the more resource blocks that a subordinate entity receives and the higher the MCS, the higher the data rate for the subordinate entity.

Figure 5:
FIG. 5 shows an exemplary channel format for an uplink (UL) channel according to some aspects of the disclosure.

An example of a UL frame structure 500 will now be presented with reference to FIG. 5. FIG. 5 shows an exemplary format for the UL with features similar to that implemented in an LTE UL. Each resource block occupies certain time (horizontal axis in FIG. 5) and frequency (vertical axis in FIG. 5) resources. The frequency resources may be arranged as a number of subcarriers or channels. The available resource blocks for the UL may be partitioned into one or more data sections and control sections. The control section may be formed at the two edges of the system bandwidth and may have a configurable size. The resource blocks in the control section may be assigned to UEs for transmission of control information. The data section may include all resource blocks not included in the control section. The design in FIG. 5 results in the data section including contiguous subcarriers or channels, which may allow a single UE or subordinate entity to be assigned all of the contiguous subcarriers in the data section.

A subordinate entity (e.g., a UE) may be assigned resource blocks 510*a*, 510*b* in the control section to transmit control information to a scheduling entity (e.g., an eNB). The UE may also be assigned resource blocks 520*a*, 520*b* in the data section to transmit data to the eNB or scheduling entity. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An UL transmission may span both slots (slot 0 and slot 1) of a subframe and may hop across frequency as shown in FIG. 5. In some aspects of the disclosure, a scheduling entity may broadcast interference tolerance information of the resource blocks that may assist the UEs or subordinate entities to determine which of the resource blocks may be used for grantless access.

Figure 6:
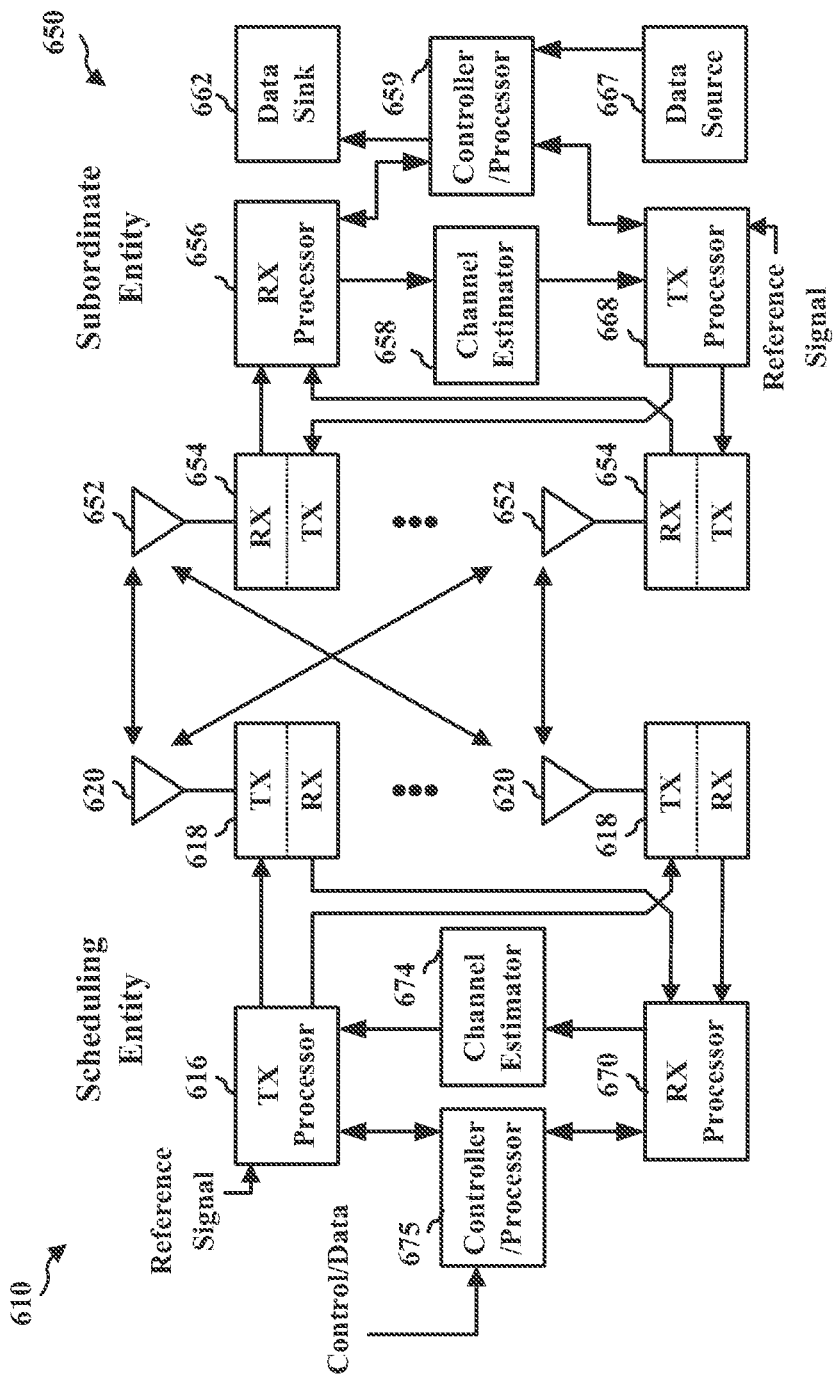
FIG. 6 is a diagram illustrating an example of a scheduling entity communicating with a subordinate entity according to some aspects of the disclosure.

FIG. 6 is a block diagram of a scheduling entity 610 in communication with a subordinate entity 650 in an access network. In one example, the scheduling entity 610 may be the same as the scheduling entity 300 of FIG. 3 or an eNB, and the subordinate entity 650 may be the same as the subordinate entity 400 of FIG. 4 or an UE. In the DL, upper layer packets from a core network (e.g., a 3GPP Evolved Packet Code) are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the subordinate entity 650 based on various priority metrics. The controller/processor 675 is also responsible for HARQ operations, retransmission of lost packets, and signaling to the subordinate entity 650. In some aspects of the disclosure, the controller/processor 675 may implement the functions of grantless UL access as described in relation to FIGS. 8-10, for example, broadcasting interference tolerance information for assisting grantless UL access.

The TX processor 616 implements various signal processing functions for the L1 layer (i.e., physical layer). The signal processing functions includes coding and interleaving to facilitate forward error correction (FEC) at the subordinate entity 650 and mapping to signal constellations based on various MCSs (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the MCS, as well as for spatial processing. The channel estimate may be derived from a reference signal and/or channel condition feedback transmitted by the subordinate entity 650. Each spatial stream is then provided to a different antenna 620 via a separate transmitter 618TX. Each transmitter 618TX modulates an RF carrier with a respective spatial stream for transmission.

At the subordinate entity 650, each receiver 654RX receives a signal through its respective antenna 652. Each receiver 654RX recovers information modulated onto an RF carrier and provides the information to the receiver (RX) processor 656.

The RX processor 656 implements various signal processing functions of the L1 layer. The RX processor 656 performs spatial processing on the information to recover any spatial streams destined for the subordinate entity 650. If multiple spatial streams are destined for the subordinate entity 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the scheduling entity 610. These soft decisions may be based on channel estimates computed by the channel estimator 658. The soft decisions are then decoded and deinterleaved to recover the data and control signals that were originally transmitted by the scheduling entity 610 on the physical channel. The data and control signals are then provided to the controller/processor 659.

The controller/processor 659 implements the L2 layer. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer (L2). Similar to the functionality described in connection with the DL transmission by the scheduling entity 610, the controller/processor 659 implements the L2 layer for the user plane and the control plane by providing header compression, ciphering, packet segmentation and reordering, and multiplexing between logical and transport channels based on radio resource allocations by the scheduling entity 610. The controller/processor 659 is also responsible for HARQ operations, retransmission of lost packets, and signaling to the scheduling entity 610. In some aspects of the disclosure, the controller/processor 659 may implement the functions of grantless UL access as described in relation to FIGS. 11-13, for example, determining/selecting UL resources for grantless access based on interference tolerance information broadcasted by the scheduling entity 610.

Channel estimates derived by a channel estimator 658 from a reference signal or feedback transmitted by the scheduling entity 610 may be used by the TX processor 668 to select the appropriate MCSs, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the scheduling entity 610 in a manner similar to that described in connection with the receiver function at the subordinate entity 650. Each receiver 618RX receives a signal through its respective antenna 620. Each receiver 618RX recovers information modulated onto an RF carrier and provides the information to a RX processor 670. The RX processor 670 implements the L1 layer.

The controller/processor 675 implements the L2 layer. In the UL, the control/processor 675 provides demultiplexing between transport and logical channels, packet reassembly, deciphering, header decompression, control signal processing to recover upper layer packets from the subordinate entity 650. Upper layer packets from the controller/processor 675 may be provided to the core network. The controller/processor 675 is also responsible for error detection using an ACK and/or NACK protocol to support HARQ operations.

In a wireless communication network (e.g., access network 100 of FIG. 1), when a subordinate entity or UE (e.g., a subordinate entity 204) needs to transmit data (e.g., uplink data), it may send a scheduling request to a scheduling entity (e.g., a scheduling entity 202) or base station (e.g., network). Upon receiving the request, the scheduling entity may send a grant signal (e.g., an uplink grant) on a downlink channel (e.g., a DL control channel) to the subordinate entity. The subordinate entity receives and decodes the grant signal to determine the resources (e.g., time and/or frequency resources) that may be utilized to transmit uplink data. Such network scheduled uplink data transmission may be called nominal transmissions or request-grant based transmissions in this disclosure.

Some classes of wireless devices or subordinate entities may be called small data devices, which typically transmit a relatively small amount of data in a wireless network (e.g., access network 100 of FIG. 1). Some non-limiting examples of small data devices include smart meters/sensors, environmental monitoring sensors, and IoT/IoE devices. Such small data devices are often battery-powered and resource-limited. Because the request-grant based transmission method involves a rather lengthy signaling procedure to establish the radio link connection with the network before the wireless device can transmit data, the battery life of the wireless device can be depleted relatively quickly. In some circumstances, it may be more energy-efficient to utilize grantless transmission in which a wireless device can start uplink transmission without requesting a network to assign, schedule, and/or grant resources.

Figure 7:
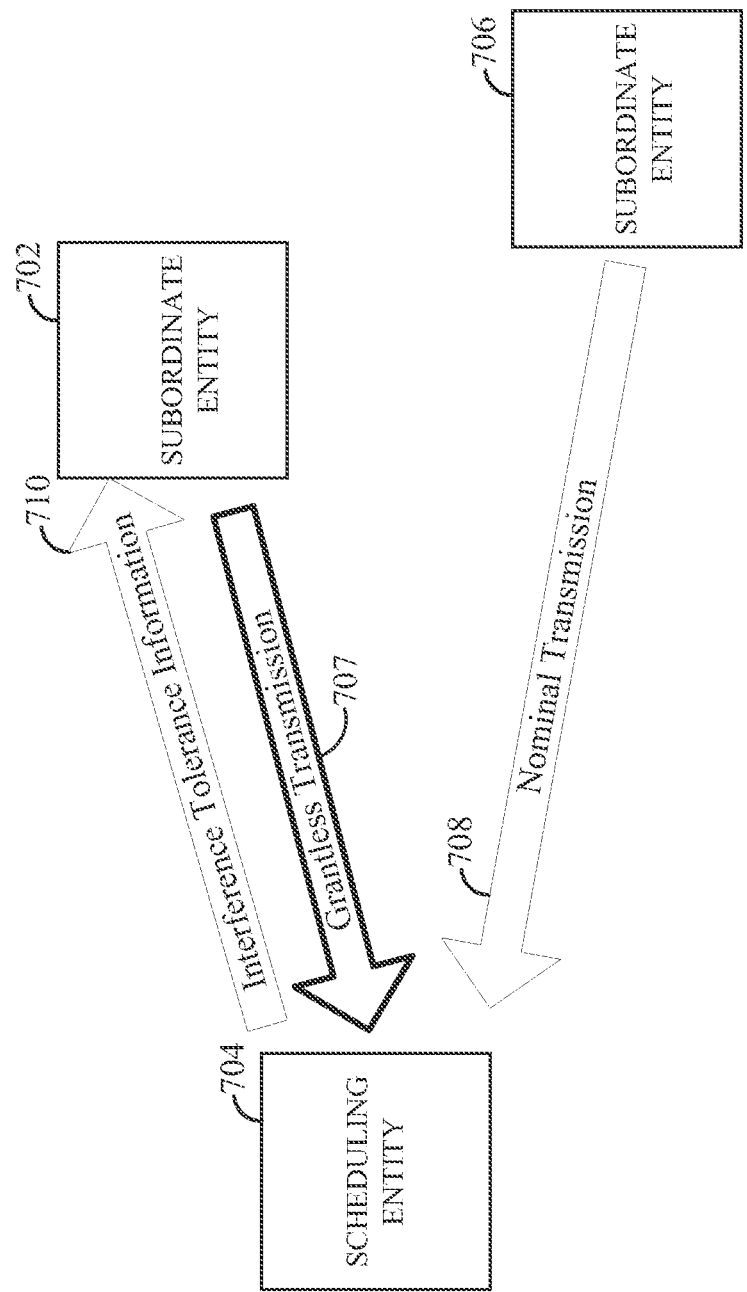
FIG. 7 is a diagram illustrating an example of grantless UL access according to some aspects of the disclosure.

FIG. 7 is a diagram illustrating an example of grantless UL access in accordance with some aspects of the disclosure. A subordinate entity 702 may utilize network resources (e.g., frequency, time, and/or channels) without network scheduling and/or allocation of the resources by a scheduling entity 704. For example, the subordinate entity 702 may choose an MCS based on certain simple open-loop power control schemes. However, unless the network or scheduling entity 704 reserves resources such as band(s), carriers, and/or channels dedicated to the subordinate entity 702, its grantless transmission 707 can potentially interfere with nominal transmissions 708 from other subordinate entities 706. In particular, when a subordinate entity 702 is close to a scheduling entity 704, a grantless transmission from the subordinate entity 702 merely relying on open-loop power control may cause severe interference to other scheduled transmissions or nominal transmissions. In some aspects of the disclosure, the scheduling entity 704 may broadcast interference tolerance information 710 to assist the subordinate entity 702 in selecting network resources for grantless uplink transmission.

According to aspects of the present disclosure, a scheduling entity 704 (e.g., a base station or eNB) can assist the subordinate entity/entities 702 (e.g., UE(s)) in selecting the network resources for grantless transmission based on the current network loading or interference tolerance level. Therefore, a grantless transmission may share the spectrum or network resources with nominal transmissions in a more effective way and cause relatively less interference to each other. In one example, the spectrum or bandwidth of the network can be divided into multiple channels or carriers. In one example, an 80-megahertz (MHz) spectrum may be divided into 16 channels of 5 MHz. The scheduling entity 704 may broadcast the interference tolerance level of each channel to facilitate grantless transmissions.

FIG. 8 is a flowchart illustrating a method 800 of broadcasting interference tolerance information to assist grantless data transmission in accordance with an aspect of the disclosure. This method 800 may be performed by a scheduling entity illustrated in any of FIGS. 1-3, 6, and 7, and/or any other wireless device. At block 802, a scheduling entity determines interference tolerance information of a plurality of network resources. For examples, the network resources may be a plurality of uplink channels illustrated in FIG. 5. The interference tolerance information is configured to individually indicate an availability of each of the uplink channels for grantless uplink data transmission. That is, the availability of each uplink channel for a certain level of grantless access is individually or separately indicated by the interference tolerance information.

In one aspect of the disclosure, the scheduling entity broadcasts the interference tolerance information for each uplink channel or carrier to assist a subordinate entity to select an uplink channel for grantless uplink transmission. The scheduling entity can balance the spectrum loading and control interference level by broadcasting this interference tolerance information to the subordinate entities.

In one aspect of the disclosure, the interference tolerance information may specify the interference tolerance level of each uplink channel separately or individually. For example, referring to FIG. 9, the scheduling entity may determine the interference tolerance information for each channel based on the network loading. At block 902, the scheduling entity determines the loading of each uplink channel. For example, the uplink channels may include one or more PUSCHs and PUCCHs as illustrated in FIG. 5. The loading of a channel may be determined based on the amount of resources of the channel allocated for nominal or scheduled uplink transmissions. The higher the loading, the more of the resources are allocated for nominal uplink transmission. The loading may be determined per subframe, time slot, TTI, and/or any suitable time duration(s).

The scheduling entity may determine two, three, or more levels of interference tolerance information for each uplink channel. In one specific example, there may be three levels for each channel: Level 1 (no grantless access allowed); Level 2 (limited grantless access allowed, but with a certain constraint, for example, an MCS limit); and Level 3 (grantless access allowed with no constraint). Level 1 may be used when a large number of nominal users/data are scheduled on the channel Level 3 may be used when no nominal user/data scheduled is scheduled on the channel.

At decision block 904, the scheduling entity determines whether the loading of each channel is greater than a first predetermined threshold. If the loading of a channel is greater than the first predetermined threshold, the interference tolerance information for this channel is set to indicate no grantless access, as illustrated in block 906. In some examples, the first predetermined threshold may have different values for different channels such that the amount of grantless data may be biased to/from certain channels.

At decision block 908, the scheduling entity determines whether the loading of each channel is less than (or equal to) the first decision threshold and greater than a second threshold. In FIG. 9, the first predetermined threshold is greater than the second threshold. Based on the loading, the interference tolerance information for this channel is set to indicate grantless access with a constraint, as illustrated in block 910, or grantless access without constraint, as illustrated in block 912 (i.e., loading is less than the second threshold). In some examples, the second threshold may be set to different values for different channels.

For the channel set to grantless access with a constraint, the grantless transmission may be limited to a certain coding rate and/or modulation. For example, a relatively lower coding rate and/or a relatively lower order modulation may achieve relatively more reliable grantless transmission when the channel is also used for scheduled or nominal transmissions. Within the scope of the present disclosure, other suitable constraints may be placed on grantless transmissions, in addition to or in the alternative to limitations on the MCS. For example, other constraints may be uplink power limit, payload size, data rate, reliability, latency, etc.

Referring back to FIG. 8, at block 804, the scheduling entity broadcasts the interference tolerance information to one or more subordinate entities or wireless devices. The scheduling entity may broadcast the interference tolerance information at any suitable intervals, rates, and/or frequencies. In one aspect of the disclosure, the interference tolerance information may be broadcasted at a frequency and/or rate based on a dynamic loading of the communication network and/or channels. For example, the interference tolerance information may be broadcasted at a relatively higher rate (e.g., relatively more frequently) when more nominal traffic is scheduled for the uplink channels, and at a relatively lower rate (e.g., relatively less frequently) when less nominal traffic is scheduled for the uplink channels.

In one example, the interference tolerance information may be broadcasted in every predetermined number of subframes (e.g., one or more subframes) in a Physical Downlink Control Channel (PDCCH) or any suitable channel, as long as there are nominal uplink data transmissions scheduled. The configuration of the PDCCH carrying this broadcast information may be included in one or more System Information Blocks (SIBs) transmitted to the subordinate entity. The SIBs may carry relevant information that helps the subordinate entity to access (including grantless access) a network or cell and perform re-selections. In general, the interference tolerance information is updated more often than the SIB s of a small data device. For example, a small data device SIB may be updated less frequently (e.g., once per day) and can be used for the general network setting for a grantless access configuration, such as MCS and pool of shared resources, etc. At block 806, the scheduling entity receives a grantless data transmission from the one or more subordinate entities utilizing the uplink network resources according to the interference tolerance information.

FIG. 10 is a diagram illustrating an example of uplink network resources utilized for grantless data transmissions based on interference tolerance information in accordance with an aspect of the disclosure. In this example, the uplink network resources include frequency resources (as shown in the vertical axis of FIG. 10) and time resources (as shown in the horizontal axis in FIG. 10). In FIG. 10, the resource elements 1000 are arranged in a resource grid, and each resource element corresponds to a particular combination of time and frequency resources that may be utilized for data transmission. In this example, the resource elements of FIG. 10 may be allocated or assigned to different levels of grantless access.

For resource elements (e.g., rows of resource elements 1004) that allow no grantless access, a subordinate entity may utilize any of these resource elements 1004 to transmit scheduled data or nominal data. For resource elements (e.g., rows of resource elements 1006) that allow grantless access with no constraint, a subordinate entity may utilize any of these resource elements 1006 to transmit grantless data without considering nominal data loading on the same resource elements. That is, subordinate entities may utilize these resource elements 1000 to transmit grantless data and nominal data. For resource elements (rows of resource elements 1008) that allow grantless access with constraints, a subordinate entity may utilize these resource elements 1008 to transmit grantless data when they are not used for nominal or scheduled data transmission. In some examples, the grantless data may be limited to certain modulation and coding schemes.

FIG. 10 illustrates one non-limiting example of a grantless data transmission scheme based on network-provided interference tolerance information for individual channels. In other aspects of the disclosure, the resource elements 1000 may be classified by other methods to provide multiple levels (2 or more) of grantless data access per channel or resource element. Moreover, the classification of the resource elements 1000 may be dynamic. For example, the grantless data access level of a resource element 1000 may change depending on the loading of the network and/or channels.

FIG. 11 is a flowchart illustrating a method 1100 of transmitting grantless uplink data based on interference tolerance information broadcasted from a scheduling entity in accordance with an aspect of the disclosure. This method 1100 may be performed by a subordinate entity illustrated in any of FIGS. 1, 2, 4, 6, and/or 7, and/or any other wireless device. In one example, the subordinate entity may be a small data device such as an IoT/IoE device or sensor.

At block 1102, the subordinate entity determines respective channel qualities of a plurality of uplink channels and corresponding modulation and coding schemes that can be supported by the channel qualities. A supportable MCS is an MCS that can achieve a certain desired uplink data rate for a certain channel quality. That is, the modulation and coding scheme used for a certain grantless uplink transmission depends on the channel quality. Some examples of modulations are BPSK, QPSK, 16QAM, and 64QAM. Some coding examples are 2 bits/symbol, 4 bits/symbol, 6 bits/symbol, and 8 bits/symbol.

FIG. 12 is a flowchart illustrating a method 1200 for determining a channel quality of an uplink channel in accordance with an aspect of the disclosure. This method 1200 may be performed by a subordinate entity illustrated in any of FIGS. 1, 2, 4, 6, and/or 7, and/or any other wireless device. At block 1202, the subordinate entity may estimate a pathloss of a downlink channel using any known methods. At block 1204, the subordinate entity converts the downlink pathloss to an uplink pathloss. For example, the conversion may be based on an empirical formula. In one example, the downlink pathloss may be scaled by a suitable scaling factor (e.g., 0.8) to obtain the uplink pathloss. At block 1206, the subordinate entity may determine a channel quality of the uplink channel based on the determined uplink pathloss.

In some examples, the uplink channel quality may be the same as the downlink channel quality, for example, in time division duplex (TDD) networks due to channel reciprocity.

FIG. 13 is a flowchart illustrating a method 1300 for determining an MCS of an uplink channel in accordance with an aspect of the disclosure. This method 1300 may be performed by a subordinate entity illustrated in any of FIGS. 1, 2, 4, 6, and/or 7, and/or any other wireless device, for example, at block 1102 of FIG. 11.

At block 1302, the subordinate entity determines a channel quality of an UL channel, for example, using the method 1200 described above with reference to FIG. 12. For example, the channel quality may be determined based on the pathloss of the channel. At block 1304, the subordinate entity determines the supportable MCS(s) based on the UL channel quality for a certain data rate. Some examples of modulations are BPSK, QPSK, 16QAM, and 64QAM. Some coding examples are 2 bits/symbol, 4 bits/symbol, 6 bits/symbol, and 8 bits/symbol.

Referring back to FIG. 11, at block 1104, the subordinate entity receives an interference tolerance information broadcast from a scheduling entity as illustrated in any of FIGS. 1-3, 6, and/or 7. The interference tolerance information is configured to individually indicate availability of one or more uplink channels for grantless data transmission. In one example, the interference tolerance information may indicate multiple levels of grantless access per channel as described in relation of FIGS. 8-10. That is, for each channel or carrier, the interference tolerance information indicates a certain level of grantless access. In one aspect of the disclosure, the interference tolerance information may indicate that a certain channel may be used for grantless uplink access with no constraint, grantless uplink access with constraints, or no grantless access. For example, the constraints may indicate an MCS limit for one or more uplink channels.

At block 1106, the subordinate entity selects an uplink channel among the one or more uplink channels and an MCS based on the interference tolerance information. For example, the uplink channels may be one of those illustrated in FIG. 10 that may be used for grantless uplink access (e.g., grantless with no constraint or grantless access with constraints). In one particular example, the subordinate entity may select one or more resource elements or channels in FIG. 10 to transmit grantless uplink data. The selected MCS may be one of those supportable MCSs determined in block 1102.

In some aspects of the disclosure, the subordinate entity may not receive the interference tolerance information broadcast. For example, the scheduling entity (or network) may not be broadcasting interference tolerance information at the time the subordinate entity wakes up to receive such broadcast. In other examples, the subordinate entity may intentionally skip or forgo receiving the interference tolerance information broadcast for various reasons such as power saving. In this case, the subordinate entity may transmit grantless data based on a predetermined procedure or constraints. In one specific example, the subordinate entity may use any uplink channel to transmit grantless data with a predetermined MCS (e.g., a lowest MCS allowed for the uplink channel) when the broadcast information has not received.

At block 1108, the subordinate entity transmits grantless data utilizing the selected uplink channel and MCS. In one example, the subordinate entity may randomly select from the available channels and the MCS to be used based on the interference tolerance information broadcast. The above-described grantless transmission method 1100 enables a subordinate entity (e.g., a small data device, IoE device, and/or IoT device) to transmit small data as grantless transmissions without requesting for a grant of scheduled/dedicated uplink resources to achieve improved energy efficiency.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of operating a data device in a wireless communication network, the method comprising:

receiving, from a scheduling entity, system information configured to provide a grantless access configuration for accessing the wireless communication network, the grantless access configuration comprising a first modulation and coding scheme (MCS); and receiving, from the scheduling entity, an interference tolerance information that is broadcasted more often than the system information;

selecting an uplink channel among a plurality of uplink channels and a second modulation and coding scheme (MCS) based on the interference tolerance information and the grantless access configuration; and transmitting grantless data utilizing the selected uplink channel and the second MCS.

2. The method of claim 1, wherein the receiving the interference tolerance information comprises receiving the interference tolerance information in a downlink control channel according to the system information.

3. The method of claim 1, wherein the interference tolerance information is configured to indicate one of three levels of different grantless access for each of the plurality of uplink channels for grantless data transmission.

4. The method of claim 3, wherein the interference tolerance information is configured to dynamically indicate different resources for grantless data transmission based on a loading of the wireless communication network.

5. The method of claim 3, wherein the three levels of different grantless access comprise:
   a first level indicating grantless access not allowed;
   a second level indicating grantless access allowed with a constraint, wherein the constraint comprises a MCS limit for transmitting data through the corresponding uplink channel; and
   a third level indicating grantless access allowed without constraint.

6. The method of claim 1, further comprising:
   determining a channel quality of the selected uplink channel; and
   determining the second MCS supportable by the channel quality.

7. The method of claim 1, wherein the transmitting the grantless data further comprises transmitting the grantless data without requesting a grant of uplink resources.

8. The method of claim 1, further comprising:
   intentionally forgoing receiving the interference tolerance information and transmitting grantless data utilizing a predetermined MCS.

9. A data device for wireless communication, comprising:
   a memory;
   a communication interface configured for wireless communication; and
   a processor operatively coupled to the communication interface and the memory,
   wherein the processor and the memory are configured to:
      receive, from a scheduling entity via the communication interface, system information configured to provide a grantless access configuration for accessing a wireless communication network; and
      receive, from the scheduling entity via the communication interface, an interference tolerance information that is broadcasted more often than the system information;
      select an uplink channel among a plurality of uplink channels and a modulation and coding scheme (MCS) based on the interference tolerance information and the grantless access configuration; and
      transmit, via the communication interface, grantless data utilizing the selected uplink channel and the MCS.

10. The data device of claim 9, wherein the processor and the memory are further configured to:
    receive, via the communication interface, the interference tolerance information in a downlink control channel according to the system information.

11. The data device of claim 9, wherein the interference tolerance information is configured to indicate one of three levels of different grantless access for each of the plurality of uplink channels for grantless data transmission.

12. The data device of claim 11, wherein the interference tolerance information is configured to dynamically indicate different resources for grantless data transmission based on a loading of the wireless communication network.

13. The data device of claim 11, wherein the three levels of different grantless access comprise:
    a first level indicating grantless access not allowed;
    a second level indicating grantless access allowed with a constraint, wherein the constraint comprises a MCS limit for transmitting data through the corresponding uplink channel; and
    a third level indicating grantless access allowed without constraint.

14. The data device of claim 9, wherein the processor and the memory are further configured to:
    determine a channel quality of the selected uplink channel; and
    determine the MCS supportable by the channel quality.

15. The data device of claim 9, wherein the processor and the memory are further configured to:
    transmit, via the communication interface, the grantless data without requesting a grant of uplink resources.

16. The data device of claim 9, wherein the processor and the memory are further configured to:
    intentionally forgo receiving the interference tolerance information and transmit grantless data utilizing a predetermined MCS.

17. A scheduling entity configured for wireless communication in a wireless communication network, comprising:
    a memory;
    a communication interface configured for wireless communication; and
    a processor operatively coupled to the communication interface and the memory,
    wherein the processor and the memory are configured to:
       transmit, via the communication interface, system information configured to provide a grantless access configuration for accessing the wireless communication network, the grantless access configuration comprising a modulation and coding scheme (MCS);
       transmit, via the communication interface, an interference tolerance information more often than the system information; and
       receive, via the communication interface, grantless data utilizing a selected MCS on a selected uplink channel among a plurality of uplink channels, the selected MCS and the selected uplink channel corresponding to the interference tolerance information and the grantless access configuration.

18. The scheduling entity of claim 17, wherein the processor and the memory, being configured to transmit, via the communication interface, the interference tolerance information, are further configured to transmit, via the communication interface, the interference tolerance information in a downlink control channel according to the system information.

19. The scheduling entity of claim 17, wherein the processor and the memory are further configured to configure the interference tolerance information to indicate one of three levels of different grantless access for each of the plurality of uplink channels for grantless data transmission.

20. The scheduling entity of claim 19, wherein the processor and the memory are further configured to configure the interference tolerance information to dynamically indicate different resources for grantless data transmission based on a loading of the wireless communication network.

21. The scheduling entity of claim 19, wherein the three levels of different grantless access comprise:
  a first level indicating grantless access not allowed;
  a second level indicating grantless access allowed with a constraint, wherein the constraint comprises an MCS limit for transmitting data through the corresponding uplink channel; and
  a third level indicating grantless access allowed without constraint.

22. The scheduling entity of claim 17, wherein the processor and the memory, being configured to receive, via the communication interface, the grantless data, are further configured to receive, via the communication interface, the grantless data without receiving a corresponding request for a grant of uplink resources.

23. The scheduling entity of claim 17, wherein the processor and the memory, being configured to receive, via the communication interface, grantless data, are further configured to receive, via the communication interface, the grantless data utilizing an MCS selected independent of the interference tolerance information.

24. A scheduling entity configured for operation in a wireless communication network, the scheduling entity comprising:
  means for transmitting system information configured to provide a grantless access configuration for accessing the wireless communication network, the grantless access configuration comprising a modulation and coding scheme (MCS);
  means for transmitting an interference tolerance information more often than the system information; and
  means for receiving grantless data utilizing a selected MCS on a selected uplink channel among a plurality of uplink channels, the selected MCS and the selected uplink channel corresponding to the interference tolerance information and the grantless access configuration.

25. The scheduling entity of claim 24, wherein the means for transmitting the interference tolerance information, are further configured for transmitting the interference tolerance information in a downlink control channel according to the system information.

26. The scheduling entity of claim 24, further comprising means for configuring the interference tolerance information to indicate one of three levels of different grantless access for each of the plurality of uplink channels for grantless data transmission.

27. The scheduling entity of claim 26, further comprising means for configuring the interference tolerance information to dynamically indicate different resources for grantless data transmission based on a loading of the wireless communication network.

28. The scheduling entity of claim 26, wherein the three levels of different grantless access comprise:
  a first level indicating grantless access not allowed;
  a second level indicating grantless access allowed with a constraint, wherein the constraint comprises an MCS limit for transmitting data through the corresponding uplink channel; and
  a third level indicating grantless access allowed without constraint.

29. The scheduling entity of claim 24, wherein the means for receiving the grantless data, are further configured for receiving the grantless data without receiving a corresponding request for a grant of uplink resources.

30. The scheduling entity of claim 24, wherein the means for receiving grantless data, are further configured for receiving the grantless data utilizing an MCS selected independent of the interference tolerance information.

* * * * *